United States Patent [19]

Huff

[11] 4,099,724
[45] Jul. 11, 1978

[54] AUTOMATIC DISC WIPING APPARATUS

[75] Inventor: Larry Dean Huff, Indianapolis, Ind.

[73] Assignee: RCA Corporation, New York, N.Y.

[21] Appl. No.: 748,052

[22] Filed: Dec. 6, 1976

[51] Int. Cl.² .............................................. G11B 3/58
[52] U.S. Cl. ........................................ 274/47; 274/2
[58] Field of Search ............................ 274/47, 1 R, 2

[56] References Cited

U.S. PATENT DOCUMENTS

| | | | |
|---|---|---|---|
| 3,578,340 | 5/1971 | Fortune | 274/47 |
| 3,930,653 | 1/1976 | Huff | 274/1 R |
| 3,992,018 | 11/1976 | Plummer et al. | 274/2 |

*Primary Examiner*—Richard E. Aegerter
*Assistant Examiner*—John W. Shepperd
*Attorney, Agent, or Firm*—Eugene M. Whitacre; William H. Meagher; Henry N. Garrana

[57] ABSTRACT

An automatic wiping apparatus, provided for a disc record player, comprises a pad supported on a free end of an elongated leaf spring. The other end of the leaf spring is angularly secured to a housing support attached to the underside of a lid of the player, such that when the lid is closed the pad will be urged into contact with the surface of a disc supported on a turntable provided in the player. A rigid frame is pivotally mounted to the housing support, and is provided with a first member for supporting the free end of the leaf spring in a raised state, precluding contact between the pad and the disc surface, in response to the string force of a tongue spring acting on a second member of the rigid frame. A one-way pawl pivotally mounted to the rigid frame cooperates with an actuating arm attached to a signal pickup carriage in the player, such that the rigid frame is pivoted against the spring bias of the tongue spring, for a portion of the translational travel of the signal pickup carriage from a standby position to playback positions, thus removing the first member from its supporting position and thereby allowing the pad to come into contact with the surface of the disc solely under the spring force of the leaf spring.

10 Claims, 8 Drawing Figures

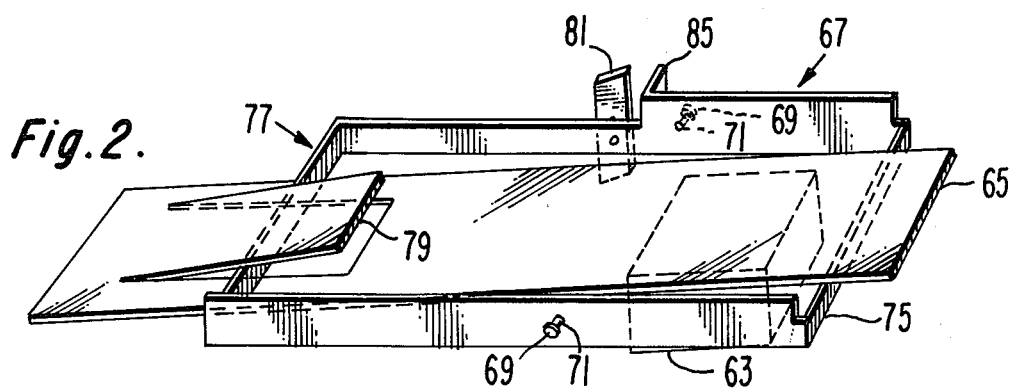
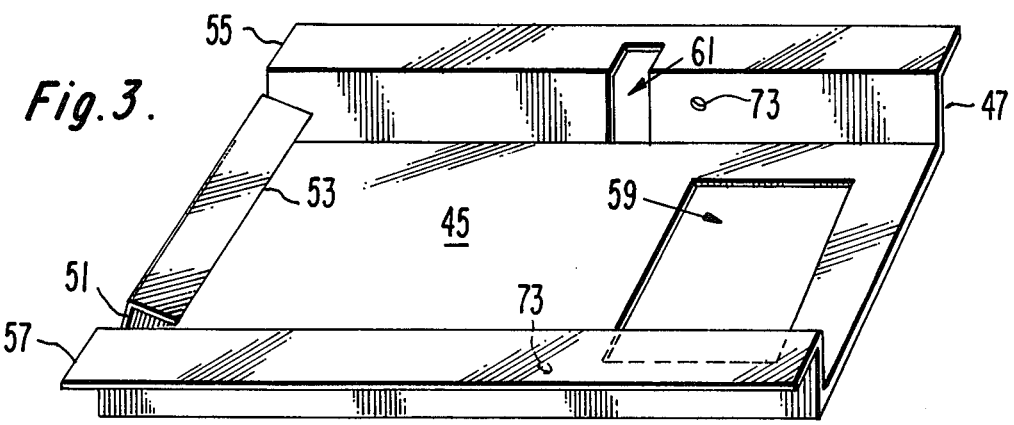
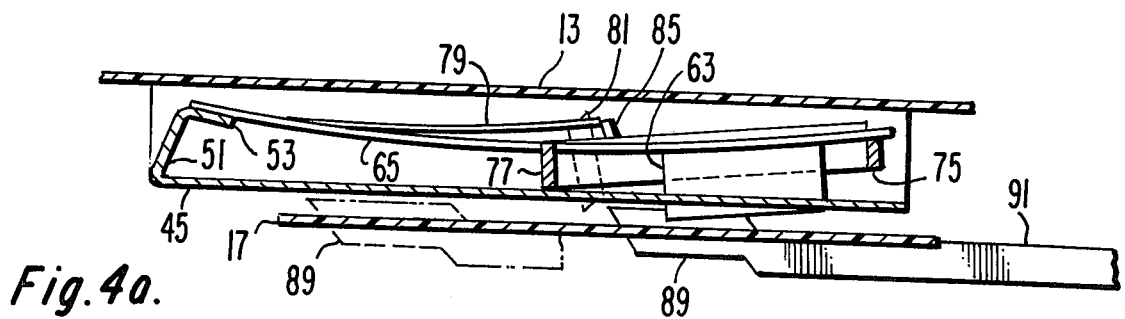
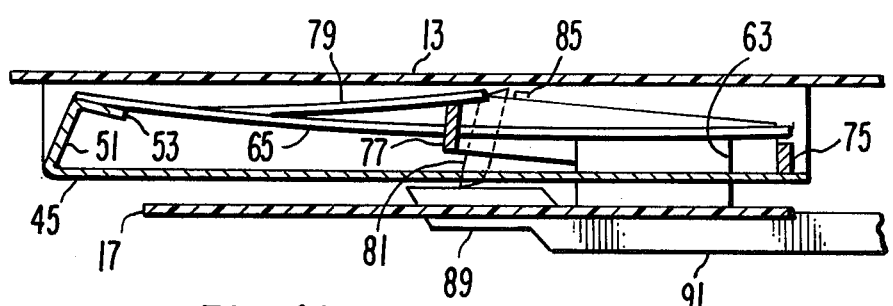

AUTOMATIC DISC WIPING APPARATUS

Information records often accumulate dust, debris particles, finger printmarks and the like, on the playing surfaces thereof which interfere with the reproduction of signal information recorded thereon. It is therefore desirable to provide some relief of the interference induced by these particles by wiping the playing surfaces of the records prior to playback.

In accordance with an embodiment of the present invention, the wiping of an information record is accomplished automatically by mechanical means incorporated in a disc player and made responsive to the operation of the disc player to accomplish the wiping of the information record. Illustratively, the information record and the record playback apparatus may be of the type described in U.S. Pat. No. 3,842,194, issued on Oct. 15, 1974, to Jon K. Clemens.

Pursuant to the principles of the present invention, the wiping of the playing surface of a turntable supported record is accomplished by means of a wiping apparatus having a pad subject to movement between a normal position where the pad is out of contact with the surface of the disc and a wiping position where the pad is in contact with the surface of the disc. Actuating means, responsive to the operation of the player, are utilized for subjecting the pad to occupancy of the wiping position prior to record playback. During record playback, the wiping apparatus is removed from contact with moving parts of the player system and the record surface, so as to present no extraneous loading thereon.

In accordance with an illustrative embodiment of the present invention incorporated into a record playback apparatus of the type disclosed in the aforementioned Clemens patent, advantage is taken of the translational travel of a signal pickup carriage to actuate and control the operation of the wiping apparatus. The wiping apparatus includes a first engaging element cooperating with a second engaging element attached to the signal pickup carriage. The disposition of the first and second engaging elements, the one with respect to the other, being such that the engagement of the first and second elements is accomplished only when the signal pickup carriage is traveling from a first position intermediate a standby and playback positions towards a second position intermediate the first and playback positions. During the engagement of the first and second engaging elements, the pad is moved into contact with the record surface. Details of the translational travel producing mechanism may be found in U.S. Pat. Nos. 3,870,320 and 3,870,835 to Torrington and Stave, respectively.

In accordance with another illustrative embodiment of the present invention, means are provided for inhibiting the operation of the wiping apparatus after the return of the signal pickup carriage to the standby position, the operation of the wiping apparatus being enabled by the opening and closing of a lid provided on the player while the signal pickup carriage is in the standby position. Thus repeated wipings are prevented during multiple playbacks of the same disc without an intervening opening and closing of the lid.

Automatic record wipers are well known in the prior art (e.g., U.S. Pat. Nos. 3,366,390—Applequist et al., and 3,572,725—Murphy). However, in many such prior art systems, the wiping of a record surface is performed continuously during record playback operations. This continuous wiping results in additional loading on player system components, which loading must often be compensated. Some prior art systems, such as Applequist et al., accomplish record wiping prior to playback. Actuation of the wiping mechanism, however, is accomplished by means extraneous to the player apparatus, such as an electric motor and motor control circuitry responsive to the rotation of the record.

In the accompanying drawings:

FIG. 2 is a perspective view of an embodiment of a wiping mechanism in accordance with the present invention suitable for use with the player of FIG. 1.

FIG. 3 is a perspective view of a housing support suitable for use with the wiping mechanism of FIG. 2.

FIGS. 4a, 4b and 4c are partially cut-away, sectioned side views of the wiping mechanism, along the line 4—4 in FIG. 1, at different instances during one cycle of operation thereof.

Figure 1:
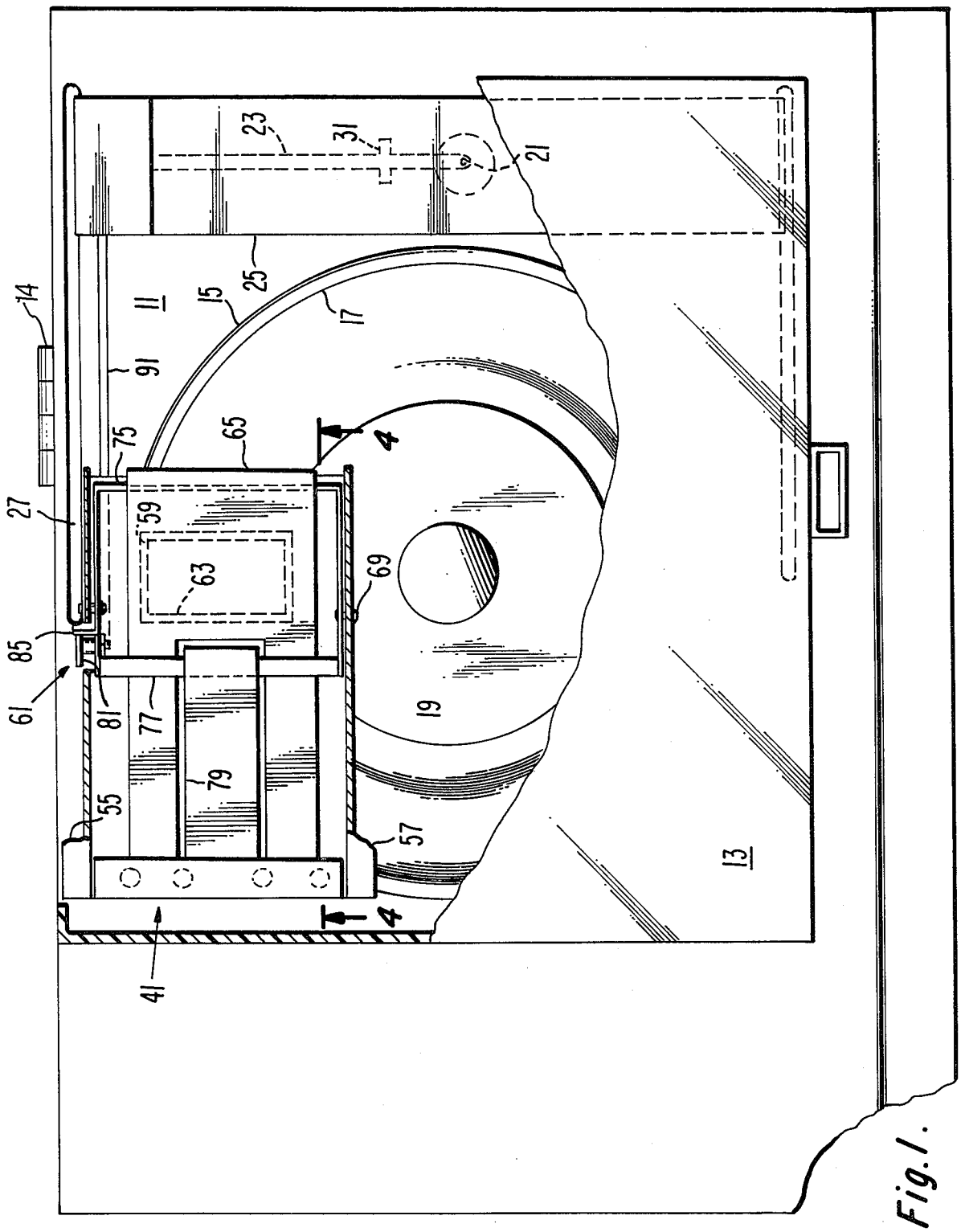
FIG. 1 is a plan view of video disc record player incorporating an illustrative embodiment of a disc wiping mechanism according to the present invention, the lid of the player is partly broken away for clarity.

In FIG. 1, a video disc player, in accordance with the disclosure of the aforementioned Clemens patent, is shown having a base 11 and a lid 13 pivoted, by means of hinge 14, to the base 11 for movement between a closed position and an open position. A turntable 15, rotatably mounted on the base 11, is adapted to support a video disc record 17 having a smooth spiral groove 19 on a major surface thereof.

A signal pickup 21 supported at one end of a conductive pickup arm 23 engages the spiral groove 19 during record playback. The other end of the pickup arm 23 is flexibly supported by a pickup arm support carried by a signal pickup carriage 25. A radial feed drive mechanism, in accordance with the aforementioned Torrington and Stave patents, traverses the pickup arm support mounted in the signal pickup carriage 25 in proper time relationship with the radial (with respect to the center of the disc) motion of the signal pickup 21 tip engaged in the spiral groove 19 so as to continuously maintain the longitudinal axis of the pickup arm substantially tangential to the spiral groove at the point of engagement. Slots 27 are provided in the base 11 for accommodating the lateral motion of the carriage 25. The feed drive mechanism includes a first drive means for moving the signal pickup carriage 25 between a standby position and playback positions and a second drive means for moving the signal pickup carriage during the playback of the disc 17. The present invention advantageously utilizes that lateral motion (in a manner to be subsequently described) to effectuate the wiping of the disc.

With reference now to FIGS. 1, 2 and 3, a wiping apparatus 41 in accordance with an illustrative embodiment of the present invention is shown mounted to the underside of lid 13. As more particularly shown in FIG. 3, the wiping apparatus 41 comprises a housing support 43 in the form of a box having a rectangular base 45 and two parallel side walls 47 and 49, along respective lengths of the base 45. A third side wall 51 shorter in height than sidewalls 47 and 49 is disposed along a width of the base 45 and is provided with a slanted flange 53 angularly disposed with respect to the plane of base 45. Sidewalls 47 and 49 are provided with respective flanges 55 and 57 which may be attached to the underside of lid 13 to secure the housing support 43 to the lid 13. Base 45 and sidewall 47 are respectively provided with apertures 59 and 61, the location and function of which will be further explained below.

In FIG. 2, the wiping apparatus 41 is shown comprising a pad 63 supported on a free end of an elongated leaf spring 65. The other end of the leaf spring 65 is attached to the flange 53 such that the pad 63 is in effect mounted to the underside of the lid 13 by means of housing support 43 and leaf spring 65. When lid 13 is in the closed position pad 63 will project out of base aperture 59 under the spring bias of lead spring 65.

Movement effecting means for retracting the pad 63 into housing support 43 comprises a rigid frame 67 movably mounted to the housing support 43 for pivoting about an axis which is laterally disposed with respect to the leaf spring 65. The frame 67 is mounted to the housing support 43 by means of two pins 69 projecting through bores 71 and 73 in frame 67 and in sidewalls 47 and 49 respectively. A first member 75 of the rigid frame 67 is disposed to support the free end of the leaf spring 65 in a raised state, where the pad 63 is retracted within housing support 43, responsively to the spring force of a cut-out tongue portion 79, centrally and longitudinally extending from the attached one end of the leaf spring, acting on a second member 77 of the rigid frame.

A one-way trip pawl 81, pivotally mounted to the rigid frame 67 near the second member 77, is spring urged into engagement with a stop shoulder 85 provided on the rigid frame 67. A coil spring 83 may be provided to insure that pawl 81 is biased towards stop shoulder 85. Pawl 81 cooperates with a raised portion 89 of an actuating arm 91 which is attached at a right angle to the signal pickup carriage 25. Both pawl 81 and raised end portion 89 form part of a means for effecting pivoting of frame 77 in a direction which releases the end of leaf spring 65 from its raised position and thereby defeats the movement effecting means. When the wiping apparatus 41 is fully assembled, a portion of pawl 81 will project through sidewall aperture 61.

As shown in FIG. 1, the housing support 43 is secured to the underside of lid 13 in such a manner that when the lid is in the closed position the pad 63, when projected through base aperture 59 under the spring force of leaf spring 65, will be in contact with groove 19 of disc 17. Of course the position of the housing support 43 is chosen to facilitate the cooperative relationship between pawl 81 and the raised portion 89 of actuating arm 91, i.e., pawl 81 is disposed in the path of actuating arm 91 as it moves with the signal pickup carriage 25.

It will now be appropriate to discuss the actual operation of the wiping apparatus 41 and the cooperative relationship among the different elements thereof during one cycle of operation. With reference to the solid line representation in FIG. 4a, actuating arm 91 is shown at the position where the signal pickup carriage 25 (not shown) is in the standby position. The raised portion 89 is positioned in the same vertical plane as pawl 81 and adjacent thereto and as the signal pickup carriage travels from the standby position to the playback position actuating arm 91 will travel (from right to left in FIG. 4a) therewith coming into engagement with pawl 81.

FIGS. 4b illustrates the cooperative relationship between the raised portion 89 and pawl 81 when the signal pickup carriage 25 is in a first position intermediate the standby position and the playback positions. As the upper edge of raised portion 89 contacts pawl 81 a pivoting motion towards stop shoulder 85 will be imparted to pawl 81. This pivoting motion will be resisted by stop shoulder 85 resulting in a pivoting motion, against the spring force of tongue portion 79, being imparted to the rigid frame 67. The pivoting of frame 67 results in a lowering of first member 75 from its raised position allowing the pad 63 to come into contact with the surface of disc 17 solely under the force of leaf spring 65.

In FIG. 4a, as the signal pickup carriage 25 progresses beyond a second position intermediate the first and playback positions, the raised end portion (shown in broken lines) will clear pawl 81 permitting the spring force of tongue portion 79 acting on second member 77 to pivot frame 67 back into the position where the first member 75 is again supporting the free end of leaf spring 65 in a raised state. It will be noted that once the raised portion 89 clears pawl 81, no loading by the wiping apparatus will exist on either the signal pickup carriage 25 or the disc record 17 during playback operations.

Figure 4C:
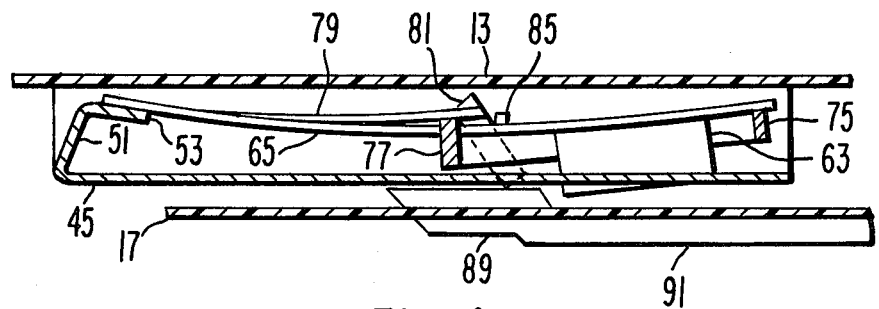

In FIG. 4c, the return travel of the signal pickup carriage 25 from the playback position to the standby position is illustrated. When the signal pickup carriage 25 is in the second position, raised portion 89 will contact pawl 81 and a pivoting motion, away from stop shoulder 85, will be imparted to pawl 81. Since that pivoting motion is in a direction away from stop shoulder 85, pawl 81 will freely pivot as it rides over the raised portion 89 and no motion will be transmitted to the rigid frame 67. As the signal pickup carriage 25 progresses beyond the first position, the raised end portion 89 will clear pawl 81 and eventually assumes the position illustrated in solid lines in FIG. 4a when the signal pickup carriage returns to the standby position.

Figure 5A:
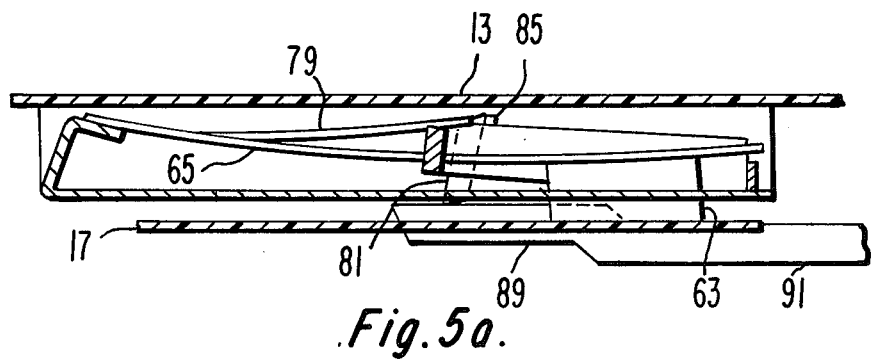
FIGS. 5a and 5b are partially cut-away, sectioned side views of a wiping mechanism, along the line 4—4 in FIG. 1, in accordance with another embodiment of the present invention.
Figure 5B:
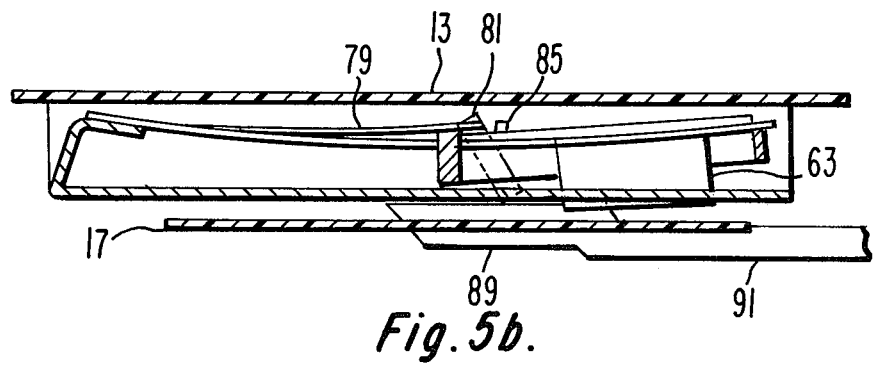

FIGS. 5a and 5b illustrate a second embodiment of the present invention wherein the length of the raised portion 89 is longitudinally extended such that it engages pawl 81 even when the signal pickup carriage is in the standby position. The effect of such an arrangement is as follows:

As shown in FIG. 5a, when the lid 13 is raised, pawl 81 will be biased by coil spring 83 (or gravity if no coil spring is used) against stop shoulder 85. As the lid is being closed, pawl 81 will engage the extended raised portion 89 in a direction tending to urge the pawl towards stop shoulder 85. This will result, when the lid is finally closed, in a pivoting motion being imparted to frame 67, by pawl 81, lowering the first member 75, and therefore bringing pad 63 in contact with the surface of the disc 17. Thereafter, when the signal pickup carriage travels beyond the second position to the playback positions, the system will operate in a manner similar to that described with respect to the embodiment of the invention illustrated in FIG. 4a. However, as shown in FIG. 5b, when the signal pickup carriage 25 is returning from a playback position to the standby position, pawl 81 will remain pivoted away from stop shoulder 85 by virtue of the fact that the extended raised portion 89 never clears pawl 81. Assuming that the lid has not been moved, a further playing of the disc will not result in actuation of the wiping apparatus since the raised end portion 89 as it moves (from right to left in FIG. 5b) is not capable of moving pawl 81 towards stop shoulder 85.

What is claimed is:

1. In a disc player including a base: a turntable mounted for rotation relative to said base and having a surface adapted to receive a disc record having a groove with information recorded therein; a stylus (21) subject to positioning in said groove for recovering said information; a signal pickup carriage for supporting said stylus, said carriage being mounted on the base for translational motion between an off-record standby position and above-record playback positions; and a lid pivotally mounted on said base for movement between a closed position and an open position; the combination comprising:

a pad for wiping the surface of a disc subject to being received on said turntable;

means for mounting said pad to the underside of said lid; said mounting means being subject, when said lid is in said closed position, to occupancy of a wiping position where said pad is in contact with the surface of the turntable; said mounting means being also subject to movement between said wiping position and a normal position where the pad is out of contact with the surface of the turntable;

defeasable means for effecting movement of said mounting means towards said normal position; and means, including an engaging element coupled to the pickup carriage and subject to movement therewith, for defeating said movement effecting means in response to the translational travel of said signal pickup carriage during only a portion of the carriage travel between the off-record standby and above-record playback positions.

2. Combination in accordance with claim 1 wherein: said engaging element is dimensioned such as to preclude defeat of said movement effecting means subsequent to the return of the signal pickup carriage from any one of said playback positions to said standby position when said lid is in said closed position.

3. Combination in accordance with claim 1 wherein said defeating means comprises a further engaging element coupled to said movement effecting means and disposed with respect to said first named engaging element such that: (a) when said signal pickup carriage is traveling from said standby position towards a first position intermediate said standby and playback positions, said first named engaging element is precluded from engaging said second named engaging element; (b) when said signal pickup carriage is traveling from said first position towards a second position between said first and playback positions, said engaging elements are engaged such that said movement effecting means is defeated thereby allowing said mounting means to occupy said wiping position; and (c) when said signal pickup carriage is traveling from said second position towards said playback positions, said first named engaging element is precluded from engaging said second named engaging element.

4. Combination in accordance with claim 1 wherein said mounting means comprises:

a housing support secured to the underside of said lid; and an elongated leaf spring having one end thereof attached to said housing support and angularly disposed with respect to the disc player lid; said wiping pad being attached to the underside of the end of said leaf spring remote from said attached one end, and subject to positioning over said turntable when said lid is in a closed position; and wherein said movement effecting means comprises:

a rigid frame, pivotally mounted on said housing support and including a first member subject to movement between (1) an elevated position supporting the free end of said leaf spring in a raised state precluding contact between said pad and a turntable supported disc record and (2) a depressed position releasing the free end of said leaf spring to assume a lowered state permitting contact between said pad and a turntable supported disc record.

5. Combination in accordance with claim 4 wherein said movement effecting means further comprises:

a cutout portion projecting along a longitudinal axis of said leaf spring from said attached one end;

wherein said rigid frame includes a second member interposed between said tongue and said leaf spring; said first member being subject to movement, in response to the spring force of said tongue, acting on said frame through said second member, in a direction where said free end portion of said leaf-spring is supported thereby in said raised state.

6. Combination in accordance with claim 5; wherein said tongue portion is integrally formed with said leaf spring.

7. Combination in accordance with claim 4 wherein said defeating means comprises:

a one-way trip pawl, subject to movement between a locked position and a free position, pivotally mounted to said rigid frame; and wherein said engaging element comprises an arm mounted on said signal pickup carriage for movement therewith and having a raised end portion cooperating with said trip pawl when said lid is in a closed position; said raised end portion being positioned for engaging said pawl during said portion of the travel of said signal pickup carriage such that said pawl is moved by said raised end portion to said locked position.

8. Combination in accordance with claim 7 wherein the length of said raised end portion is chosen such that said raised end portion engages said pawl when said signal pickup carriage is in said standby position.

9. Combination in accordance with claim 7 wherein the length of said raised end portion is chosen to preclude the engagement of said raised end portion with said pawl when said signal pickup carriage is in said standby position.

10. In a disc player system comprising a base, a turntable mounted for rotation relative to said base, a signal pickup carriage reciprocably mounted on the base for travel between a standby position and playback positions and a lid pivotally mounted on said base for movement between a closed position and an open position; the combination comprising:

a pad;

a housing support mounted on the underside of said lid; an elongated leaf spring for supporting said pad on a free end thereof, the other end of the leaf spring being angularly secured to said housing support such that when the lid is in said closed position the pad will be biased, by the spring force of the leaf spring, into contact with the surface of said turntable;

a cut-out tongue portion centrally and longitudinally extending from the attached one end of said leaf spring;

a rigid frame, including first and second members, mounted to said housing support for pivoting about an axis which is laterally disposed with respect to said leaf spring, said first member of said rigid frame being disposed for supporting the free end of said leaf spring in a raised state, precluding contact between said pad and said turntable, in response to the spring pressure of said cut-out tongue portion acting on said second member of said rigid frame;

an actuating arm attached to said signal pickup carriage and including a raised end portion; and a one-way trip pawl pivotally mounted on said rigid frame and cooperating with said raised end portion, said rigid frame being subject to pivoting against the spring bias of said cut-out tongue portion, in response to the engagement of said pawl with said raised end portion during part of the travel of said signal pickup carriage from said standby position to said playback positions, such that said first member is lowered from its supporting position thereby allowing said pad to come into contact with the surface of said turntable.

* * * * *